(No Model.)
D. R. BOWKER.
EXTRACTING WEEVILS FROM GRAIN.
No. 505,648. Patented Sept. 26, 1893.
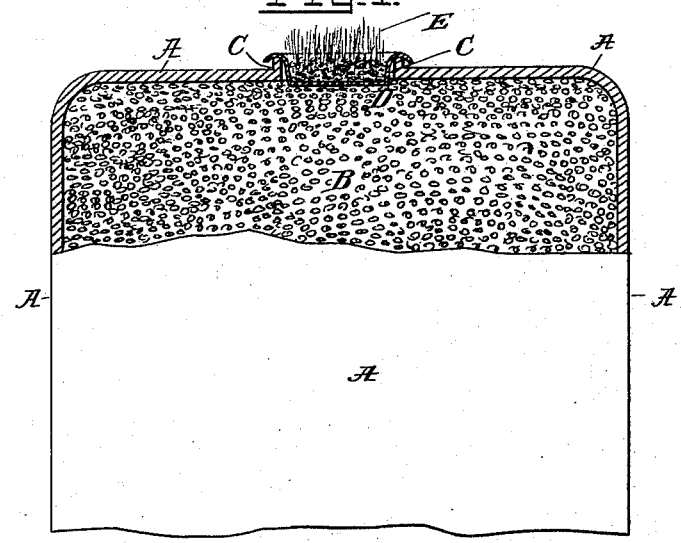
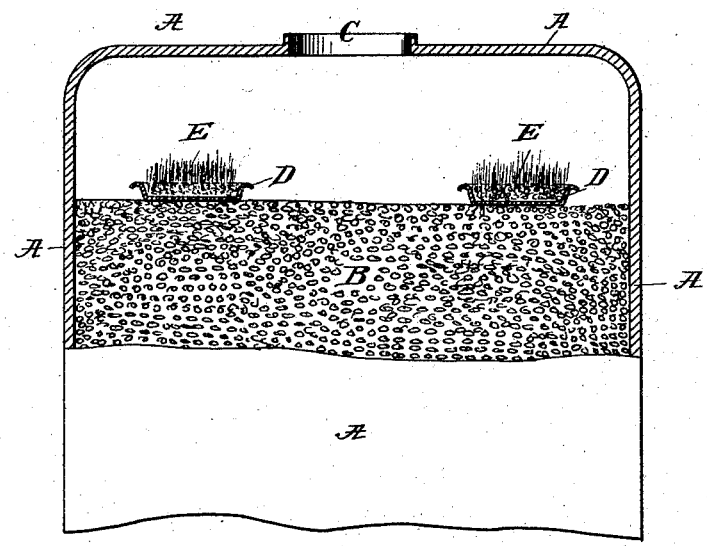
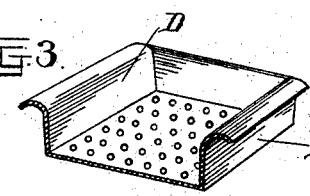
WITNESSES:
Edward C. Rowland.
John E. Lacey
INVENTOR
Daniel R. Bowker
BY Phillips Abbott
ATTORNEY

UNITED STATES PATENT OFFICE.

DANIEL R. BOWKER, OF BROOKLYN, NEW YORK.

EXTRACTING WEEVILS FROM GRAIN.

SPECIFICATION forming part of Letters Patent No. 505,648, dated September 26, 1893.

Application filed December 19, 1892. Serial No. 455,728. (No model.)

*To all whom it may concern:*

Be it known that I, DANIEL R. BOWKER, a citizen of the United States, and a resident of Brooklyn, in the county of Kings and State of New York, have invented a certain new and useful Method of and Apparatus for Extracting Weevils from Grain, &c., of which the following is a specification.

My invention relates to an improved method of removing weevils from grain and to the apparatus or devices whereby I practice my method.

Generally stated the invention consists in a box or receptacle placed at the upper open end of the grain bin and upon the grain itself, or upon the grain down in the bin, if it does not extend to the top thereof, and in this box or boxes, if more than one be employed, I place a quantity of the grain, which has been caused to sprout in any suitable manner. The bottoms of the boxes are perforated, so that the weevils can pass upwardly from the grain, and enter the box. The sprouting grain and the moisture thereof attracts the weevils and they come from all directions through the grain or up the sides of the bin and enter the box which at stated periods will be removed with the weevils contained therein and they will be destroyed. The box or boxes will then be resupplied with fresh sprouting grain and replaced in the mouth of the bin or within it on the grain as before.

In the drawings hereof, Figure 1. illustrates in section, the upper part of a grain bin, the weevil box being in the open upper door or opening therein. Fig. 2. illustrates, also in section, a grain bin in which the grain does not come to the top of the bin and the weevil boxes are shown as resting on the top of the grain. Fig. 3. is a perspective of a weevil box, the side toward the observer being removed.

A, is the grain bin. B, is the grain therein. C, is the opening at its upper end. (The cover of the opening which is at times necessary to use, is not shown because when the weevil boxes are in use it is removed.)

D, D, are the weevil boxes having perforated bottoms, see Fig. 3. E, is the sprouting grain therein.

In Fig. 1, the box rests in the mouth or opening of the bin upon, or very near to the grain, the bin being full of grain.

In Fig. 2, there are two boxes, which rest on the grain.

A little fertilizing material may be mixed with the grain in the boxes so that its sprouting will be expedited. Guano or common soil preferably enriched and dampened will answer the purpose.

The growth of the grain in the boxes draws the moisture and heat from the grain in the bins and prevents deterioration from mold and rust, and should weevils appear, they will be attracted to the sprouting grain, and when they have gathered themselves together in the box or boxes, passing upwardly from the grain through the perforated bottoms of the boxes, or otherwise entering it they will be removed and the weevils destroyed. The boxes will then be replenished with freshly sprouted grain and replaced in the bins.

The bottoms of the boxes may well be made of wire netting, preferably copper, and the ends of the boxes may be perforated or have openings therein as well as the bottom if desired.

I claim—

1. A grain bin having an opening at its top, and a weevil collecting box having a perforated bottom contained in said bin, and adapted to be passed through said opening substantially as set forth.

2. In combination with a grain bin having an opening at its top, a box having a perforated bottom containing sprouting grain therein, said box being contained in said bin, and adapted to pass through said opening substantially as set forth.

3. The method herein described of extracting weevils from grain consisting in instigating growth in a portion of the grain at the upper part of the bin said portion being inclosed within a device removable therefrom substantially as set forth.

Signed at New York, in the county of New York and State of New York, this 14th day of December, A. D. 1892.

DANL. R. BOWKER.

Witnesses:
PHILLIPS ABBOTT,
E. SIMPSON.